United States Patent [19]

Beckstein

[11] Patent Number: 4,894,891
[45] Date of Patent: Jan. 23, 1990

[54] APPARATUS FOR MEASURING THE WEFT THREAD POSITION AND FOR ALIGNING THE WEFT THREAD IN TEXTILES

[75] Inventor: Hellmut Beckstein, Bad Abbach, Fed. Rep. of Germany

[73] Assignee: Mahlo GmbH & Co. KC, Saal Dobau, Fed. Rep. of Germany

[21] Appl. No.: 190,597

[22] Filed: May 5, 1988

[30] Foreign Application Priority Data

May 18, 1987 [DE] Fed. Rep. of Germany ......... 371579

[51] Int. Cl.$^4$ .............................................. D06H 3/12
[52] U.S. Cl. ...................................... 26/51.4; 26/51.5
[58] Field of Search ....................... 26/51.3, 51.4, 51.5, 26/76

[56] References Cited

U.S. PATENT DOCUMENTS

| 2,795,029 | 6/1957 | Robertson et al. | 26/51.4 |
| 3,146,511 | 9/1964 | Hoffman | 26/51.4 |
| 3,167,843 | 2/1965 | Robertson et al. | 26/51.4 |
| 3,324,718 | 6/1967 | Gibb | 26/51.4 |
| 3,636,598 | 1/1972 | Hannaway | 26/51.4 |
| 3,751,774 | 8/1973 | Hannaway | 26/51.4 |
| 3,839,767 | 10/1974 | Leitner et al. | 26/51.4 |
| 4,517,712 | 5/1985 | Diggle Jr. et al. | 26/51.4 |

Primary Examiner—Werner H. Schroeder
Assistant Examiner—Jodi A. Tokar
Attorney, Agent, or Firm—Burgess, Ryan and Wayne

[57] ABSTRACT

The invention is a mechanical method for measuring the position of a weft thread in a moving textile fabric and aligning the weft thread. The invention is also an apparatus for carrying out the method. The method comprises introducing substantially at points, a tension (in the direction of the weft thread) and to scan at least in two places the forces that appear in the textile and therefrom determine the draft angle. The method also emcompasses stretching the textile sheet with increasing force in the direction of travel over a follower stretching device and measuring the propelling/dragging forces on the stretching device and determining the draft angle from those measurements.

2 Claims, 8 Drawing Sheets

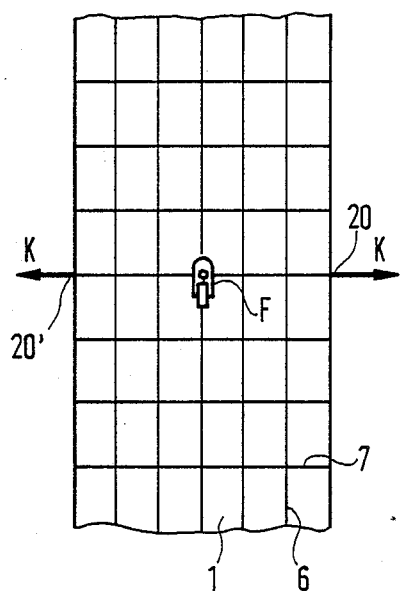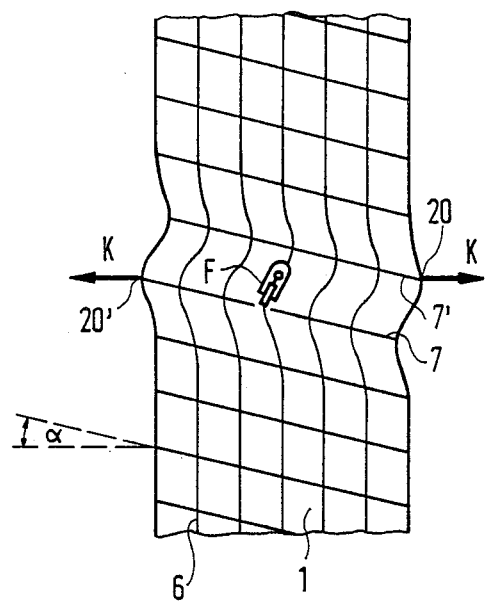

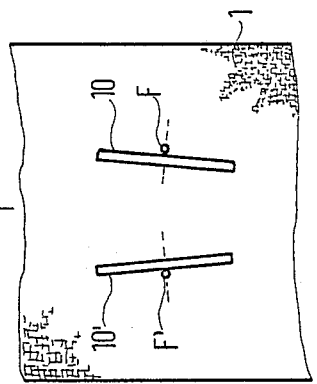
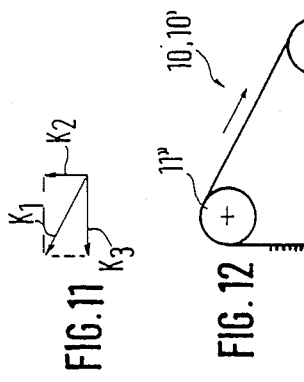
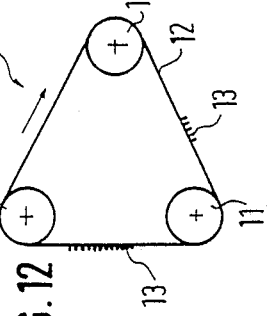
FIG. 10
FIG. 11
FIG. 12
FIG. 7
FIG. 9
FIG. 8
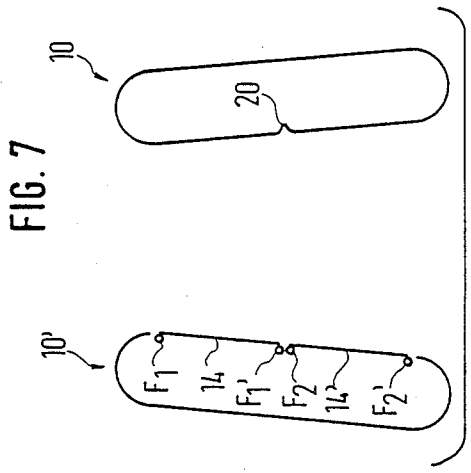
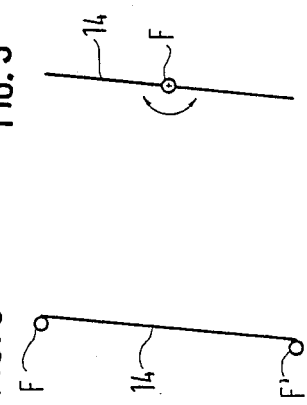

APPARATUS FOR MEASURING THE WEFT THREAD POSITION AND FOR ALIGNING THE WEFT THREAD IN TEXTILES

The invention concerns a process for measuring the position of a weft thread in a textile fabric and for aligning the weft thread. The invention is also an apparatus for carrying out the process.

BACKGROUND OF THE INVENTION

In the production of textiles, the warp and weft thread intersect at precisely right angles. However, during subsequent working procedures, the textile can become drawn. The distortion can be removed by straightening machines which use the draft angle of the weft thread as a control value. Accordingly, the draft angle must be measured.

Optical devices are known for measuring the draft angle. In an optical device, a source of light irradiates the moving textile sheet. The transmitted or reflected light is converted to electric signals and the angular course of the weft thread is determined from the signals.

However, there are many types of materials in which the position of the weft thread can not be controlled by optical scanning means. Longitudinally ribbed corduroy, thick rough materials, and the like, are not suitable for handling by optical means.

As it will be explained in more detail hereinbelow with reference to FIGS. 1 and 2, mechanical methods which make use of a special property of the fabrics can be used for detecting the course of the weft thread in those materials that cannot be optically scanned. If forces K are now introduced in the textile sheet 1 by tension-introducing devices 20, 20', substantially no changes results in the length of the weft thread 7 or in the width of the textile sheet 1 when the weft threads extend precisely between the tension-introducing points 20 (FIG. 1). But if the weft threads lie diagonally to the connecting line between the tension-introducing devices 20, 20', then there results, as shown in FIG. 2, a displacement in relation to each other of the different weft threads 7, 7', since each weft thread 7 or 7' has tension applied to only one end. Due to the displacement of the weft threads 7, 7' relative to each other this causes the warp thread 6 to assume a diagonal position in the area between the "drawn" weft threads. This phenomenon is made use of in the apparatus according to U.S. Pat. No. 2,795,029 wherein a mechanical detector F in the form of a caster wheel follows upon the textile sheet 1. This caster wheel F follows the "trace" of the warp threads 6 so that in the case shown in FIG. 2, the angular position of said caster wheel F (which can be scanned, for instance, by a potentiometer) makes possible an indication about the draft angle $\alpha$, that is, the diagonal position of the weft threads 7 relative to the warp threads 6.

One disadvantage of this method is that the sensitivity of the equipment in respect to the draft angle is relatively poor and the method is subject to interferences.

There is also known a process for "automatic" alignment of weft threads in which use is made of the forces acting on the textile due to applied tension. An example of this appears in EP-A-O 136,155. In this method, the continuous textile sheet is guided by the edges over needle-wheels having axles angularly offset in respect to each other in a manner such that the textile sheet is stretched when running over a certain peripheral angle of the wheels. The wheels are free-wheelingly disposed on their axles. As long as the weft threads extend exactly at right angles with the warp threads, identical moments act upon the needle-wheels. But when a diagonal distortion is present in the textile sheet 1, as for example illustrated in FIG. 2 on the fabric 1, there are applied to the needle-wheels, due to the stretched weft threads 7, torques which make one wheel run forward or backward in relation to the other wheel. In this manner, an "automatic" rectification of the distortion is obtained. But this rectification is not satisfactory since as the draft angle decreases, the moments acting upon the wheels likewise decrease. The method is a "classical" case of a proportional adjustment in which error in the draft angle inevitably remains.

Departing from the above stated prior art, the problem to which this invention is addressed is to improve a process and an apparatus of the above-mentioned kind in the sense of making possible by simple means, an improved mechanical scanning of the course of the weft thread or draft angle and suitable method of alignment.

BRIEF SUMMARY OF THE INVENTION

This problem is ameliorated by the process of the invention in which tension is introduced into the fabric at a point in the direction of the weft thread and the direction of the weft thread is scanned by a mechanical force detector at at least two consecutive points in the direction of travel of the fabric sheet. The aligning elements are controlled to equalize the forces at the detectors. It is essential to the present invention that the tension forces be introduced substantially at points in the fabric and that the distribution of the tension thereof over the textile sheet be determined. Since the textile sheet is not homogeneous in regard to its tensile strength, it is possible, from the distribution of force, to arrive at a conclusion concerning the direction or course of the weft threads (direction of the greatest tensile strength of the fabric).

When a force is introduced in one edge of the fabric and the distribution of force, or the reproduction thereof, is measured on the other edge of the fabric, a diagonal distortion is easily detectable. If the force is introduced in the middle of the textile sheet and measured on both edges of the material, arched distortions can also be easily found. It obviously is also possible to work with smaller sections (seen in the direction of width of the fabric) and to distribute several tension introduction points and force measuring points over the width of the textile sheet so as to be able to detect even garland distortions.

In a second solution of the above stated problem, the propelling or dragging forces applied to the follower conveying means due to the stretching is measured and in the case of a distortion, it is made the basis of the aligning operation that follows. If only two follower stretching devices situated on the edges of the material are used, it is possible to detect and rectify a diagonal distortion. It is also possible to provide a plurality of stretching devices arranged over the width of the textile sheet so as to be able to detect the direction of distortion over the whole width of the textile sheet and thus be able to determine and rectify even garland distortions.

BRIEF DESCRIPTION OF THE DRAWINGS

Other features essential to the invention and the embodiments are explained in more detail with reference to the drawings. In the drawings:

FIGS. 1 and 2 are a diagrammatic illustration of the prior art;

FIGS. 7 to 9 are other preferred embodiments of the tension-detecting devices that can be used in the apparatus of FIGS. 3, 5 or 6;

FIG. 10 is an embodiment for the other possible solution according to the invention;

FIG. 11 is a diagram of force to explain the apparatus according to FIG. 10;

FIG. 12 is, seen from the side, a follower stretching device that can be used in the embodiment according to FIG. 10;

Figure 3:
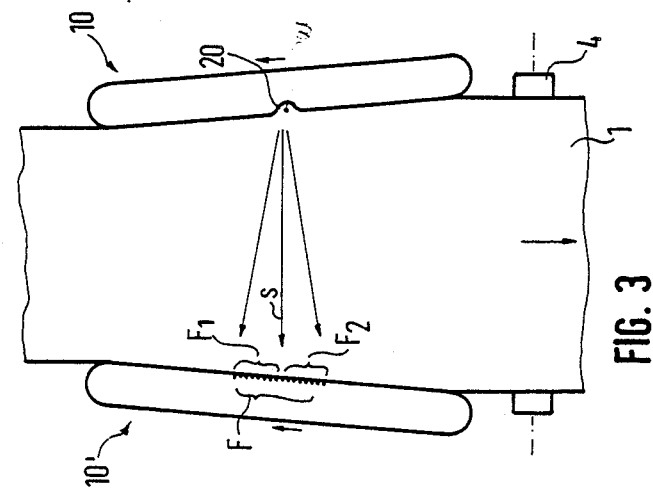
FIG. 3 is a first preferred embodiment of the invention for measuring a diagonal distortion.

A tentering apparatus with short chain links is used in the preferred embodiment of the invention shown in FIG. 3. The drawing describes the path covered by the chain links or the track for the chain. On one side (left in FIG. 3), the track is divided into many short portions provided with force sensors F. The arrangement is made in a manner such that the force components are detected perpendicular to the direction or course (indicated with arrow) of the textile sheet 1. On the other side, the material is stretched by quite a short length that is, approximately at points, by a tension-introducing device 20. In this case, the tension-introducing device 20 is constructed as an outwardly directed "vaulted" curvature in which case the tension applied by the stretcher 10 is reduced at points in this place.

Therefore, the force sensors form together a force detector F disposed in nominal direction S of the weft thread symmetrically to the tension-introducing device 20. The greatest force here is absorbed by the individual detector element F in which ends the weft thread drawn on the point W. An alternative evaluation results when the individual detector elements Fe are divided in two groups F1 and F2. When, in this evaluation the main force direction corresponding to the course of the weft thread is precisely in the nominal direction S of the weft thread (see the arrows in FIG. 3), that is, moves on the symmetric axis of the arrangement, the forces acting upon the groups F1 and F2 of the detector F are likewise symmetrically distributed so as to obtain in a differential measurement of the occurring forces (the output signal of the first sensor is subtracted from the output signal of the last sensor, etc.), the output value zero. But if a draft angle is present, then the sensors on one end of the detector F will detect a higher tension force than those at the other end and thus the differential value is not zero. According to this differential value, the guide chains 10, 10' can now be driven at different speeds until the differential value again becomes zero. The fabric can thus be exactly aligned.

Figure 4:
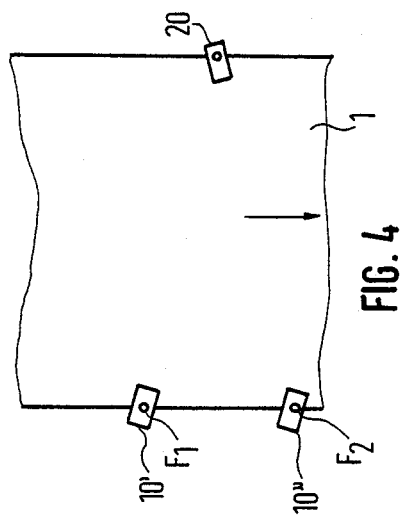
FIG. 4 is a second preferred embodiment of the invention for measuring a diagonal distortion.

In the preferred embodiment of the invention shown in FIG. 4, the tension is introduced via an outwardly intermittently plucking or permanently drawing force generator such as a friction wheel or a textile-sheet guide 20, while the force is measured via opposite textile-sheet guides or the like 10' and 10" with force detectors F1 and F2 mounted thereon. Due to their (variable) diagonal position, the textile-sheet guides or the like take care that the weft threads be drawn outwardly at the point of application of the guide 20. If the weft thread is straight, the magnitude of the force exerted on both opposite textile-sheet guides or the like 10' and 10" is equal and therefore the difference is zero. But if the force in the textile-sheet guide 10' is greater than in the textile-sheet guide 10", this indicates the direction of the distortion and with adequate evaluation of the result, the magnitude thereof.

An arrangement of four or more force transmitters, friction wheels, textile-sheet guides, or the like along one edge with respective force sensors is selected in another preferred embodiment of the invention in order to obtain a correspondingly better solution with improved evaluation of the angular proportionality.

Figure 5:
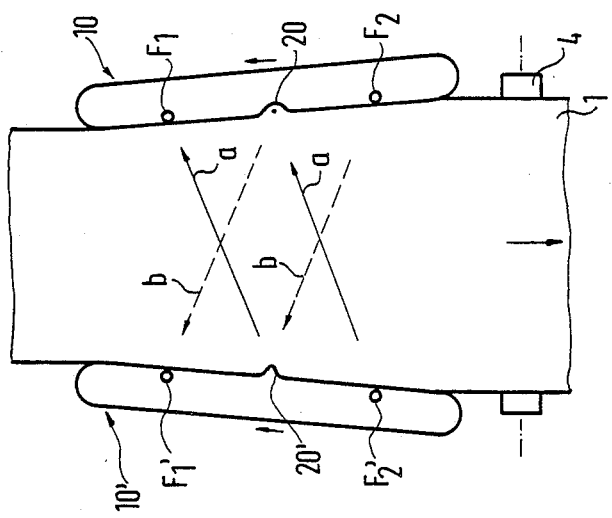
FIG. 5 is an embodiment of the invention with increased sensitivity but otherwise similar to that of FIG. 3.

In another preferred embodiment of the invention shown in FIG. 5, the arrangement is completely symmetrical and the tension-introducing device 20, the same as in the embodiment of FIG. 3, pulls the weft threads while the other tension-introducing device 20' effects at points, a reduction of the tension already existing in the textile sheet 1 due to the stretching means 10, 10'. Furthermore, in the arrangement shown in FIG. 5, there are provided four (separate) force detectors F1, F2 or F1', F2' which of course can be arrays of several separate sensors. In this preferred embodiment of the invention, the groups of separate sensors can be arranged in a bridge circuit. In a direction of the weft threads along the arrows in FIG. 5 (the draft angle is shown exaggeratedly large), the output signal of the detector F1 diminishes in comparison with the zero value (equal to zero in draft angle) while the output value of the detector F1 increases. If the draft angle extends in the other direction, the same applies to the detectors F2 or F1'. Due to the fact that the detectors can be disposed in a bridge circuit, an increased sensitivity of the system results, as a linearization of the output values.

Figure 6:
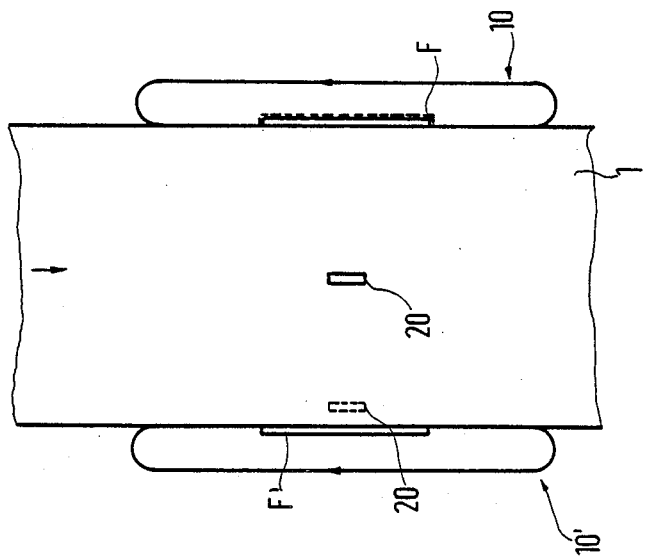
FIG. 6 is another preferred embodiment of the invention with changed introduction of force.

In FIG. 6 is shown another preferred embodiment of the invention. The embodiment can be used in two different cases. In one case, the tension-introducing device 20 can be constructed as a wheel which presses from above on the textile sheet 1 and thus introduces a tension since the textile sheet 1 is retained by its edges between the aligning elements 10, 10'. If in this case the tension-introducing device 20 is situated in the middle of the textile sheet 1, there can be detected via two detector devices F, F' on both edges not only diagonal but also arched distortions. If the tension-introducing device 20 is positioned on one edge of a textile sheet 1, it is possible to measure a diagonal distortion (broken lines) via a single detector F on the opposite side of the fabric.

Other preferred embodiments of the invention are explained with reference to FIGS. 7 to 9, special attention being called here to the construction of the detector devices.

As shown in FIG. 7, a detector device can comprise two track sections 14 and 14' each one being mounted by its end on a force detector F1, F1' or F2, F2'. The tension-introducing device 20 is again arranged opposite the detector device (symmetrically in respect thereto). In this arrangement, there result two maximum values according to the direction of the distortion when both detector pairs F1, F1' or F2, F2' are operated in a differential circuit. The draft angle in both directions can then be deduced from these values.

In the embodiment of the invention shown in FIG. 8, only two force sensors are necessary since both rail sections are merged into a single rail section 14. These two sensors are each arranged on the terminal points of the whole track or of said rail.

FIG. 9 shows a third embodiment in which a rail 14 (itself rigid) rotatable about its center, is suspended on a torque detector F. When the measured torque goes toward zero, the draft angle (in suitable arrangement of the tension-introducing device 20) is likewise zero.

The aforementioned embodiments can be combined with each other. In addition it must be said that the tension-introduction is not indispensably static but can be dynamically effected. This means that at a suitable location a force is applied intermittently that is, as vibrations, and the output signals of the force sensors are scanned via a controlled rectifier (lock-in amplifier), the control being exerted via the vibration frequency. In this manner, an increase in the signal-to-noise ratio is possible.

The embodiment shown in FIG. 10 is a second alternative to the solution of the problem. If the textile sheet 1 is allowed to run over two friction or needle wheels 10, 10' whose axes of rotation form an obtuse angle, the fabric is stretched between the wheels 10, 10'. If a distortion exists and the weft threads therefore, do not extend in a nominal direction, there results from the force K1 (FIG. 11) in the direction of the weft thread, a force component parallel with the axis of rotation and suspended over the bearings of the wheels 10, 10' and a propelling or dragging force component K2. In the arrangement shown in FIG. 10, the wheels 10, 10' are provided with torque detectors F, F' from the output values of which the force component K2 can be deduced. From the difference of the torque or force components K2 measured over the detectors F, F', the diagonal distortion of the textile sheet 1 can be determined.

In the variant shown in FIG. 12, the wheels are replaced by chains 12 guided over rollers 11, 11', 11" in a triangular path. The chains 12 are provided with needles 13 or can have an adhesive coating so that in case of a diagonal relative position of two such stretching devices 10, 10', tension can be applied to the fabric.

Figure 13:
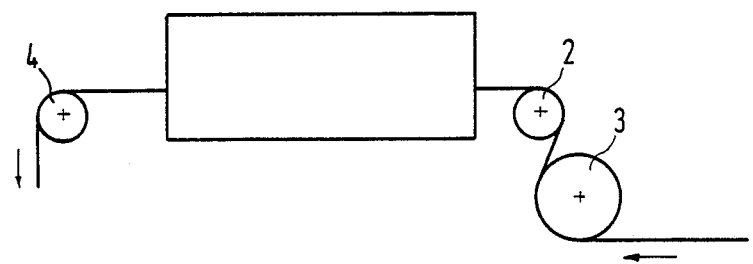
FIG. 13 is a total design of an apparatus for measuring and/or aligning wherein is possible a force-free guidance seen in transportation direction.

The distortion can be measured specially free of static when at the same time forces in the travelling direction are as weak as possible. This embodiment is shown in the arrangement of FIG. 13. Here an intake roller 2 is arranged before the stretching/measuring device proper (shown as a small box) and a take-up roller 4 is arranged behind the apparatus, said rollers being provided with an adhesive coating and smoothly driven via electromotors (not shown). By proper scanning (known per se), it is possible to ensure with this arrangement a guidance of the textile sheet 1 substantially free of longitudinal tension within the measuring device.

Figure 14:
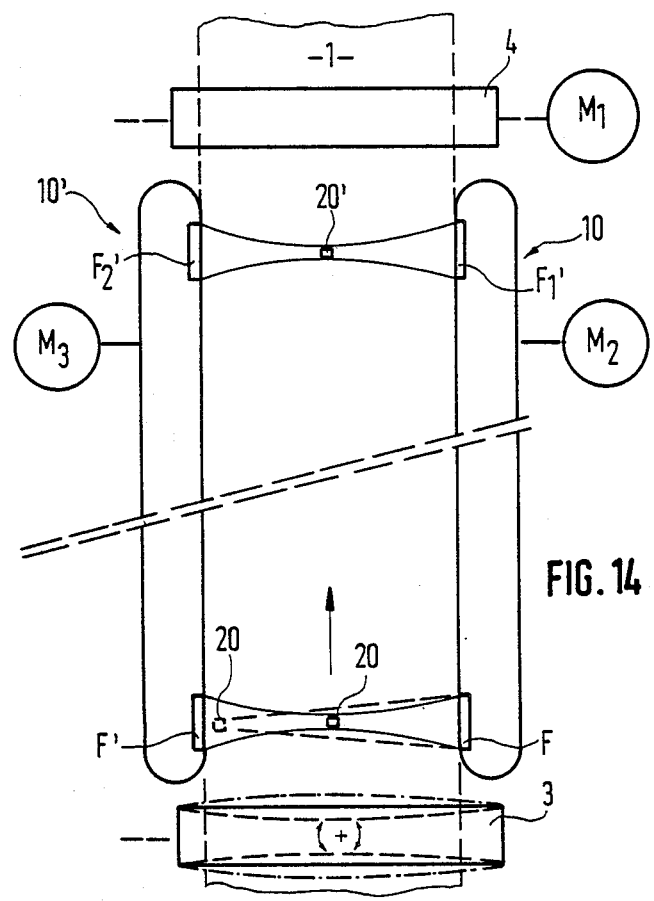
FIG. 14 is a basic illustration of measuring and aligning devices on a conventional stretcher.

The preferred embodiment of the invention shown in FIG. 14 is a conventional stretcher (already existing in a plant if needed) having stretching chains 10, 10'. In the entry area, a tension-introducing device 20 is mounted either centrally or on one of the edges (shown with broken lines). In case of a central tension-introducing device, there are provided two detector devices F, F' and in case of a lateral tension-introducing device 20, only one detector device F is provided. The statements made above regarding FIG. 6 also apply here.

A central tension-introducing device 20' with detectors F1', F2' is provided in the outlet area.

A diagonal and/or arched distortion is detectable via the measuring devices. To be able to rectify a diagonal distortion, there is provided in front of the inlet of the arrangement shown in FIG. 14, a straightening roller 3 which is pivotally supported (see arrow). Alternatively, or also additionally, the roller 3 (or an additional roller 3) can be provided for rectifying arched distortions that is, a roller whose thickness (camber) is adjustable. The distortions detected with the measuring system can thus be corrected.

However, another adjustment of diagonal distortions is possible by suitable differential control of the chain 10 relative to the chain 10'.

The measuring system in the outlet area of the apparatus can detect arched distortions, and for rectifying the arched distortions, the take-up roller 4 can be suitably controlled via its motor M1 so that the take-up roller 4 can be accelerated when the arch slows down.

Figure 15:
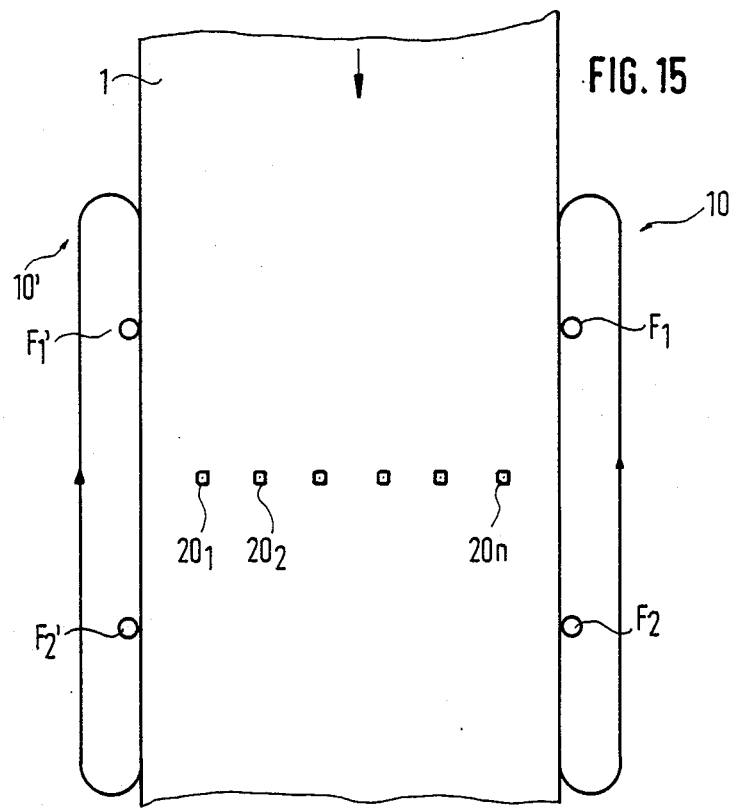
FIG. 15 is another preferred embodiment of the invention with several tension introducing devices.
Figure 16:
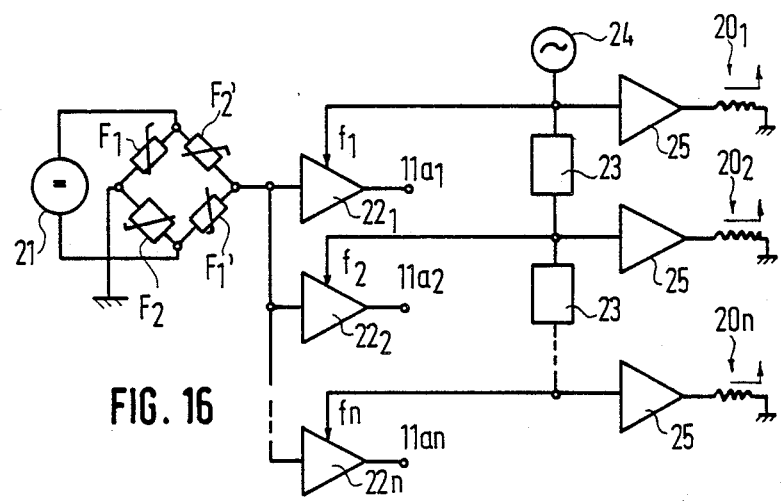
FIG. 16 is a diagrammatic block wiring diagram of a measuring system that can be used in connection with FIG. 15.

Hereinbelow is described in detail another preferred embodiment of the invention with reference to FIGS. 15 and 16. Here, the textile sheet 1 is guided between two chains 10, 10' of a stretcher similarly to the arrangement of FIG. 6, the detectors F1, F2 or F1', F2' on the chains 10, 10' being provided in a symmetrical arrangement similar to the one of FIG. 5. A plurality of tension-introducing devices $20_l$ to $20_n$ is disposed on the symmetry line (at right angles with the direction of travel), said tension-introducing devices being able to apply the tension in the form of vibrations with adjustable frequency f1 to fn.

The detectors F1 to F2' are arranged in a bridge circuit (see FIG. 16) fed by a power source 21 and having its outlet at the inlet of lock-in amplifiers $22_l$ to $22_n$. To feed the tension-introducing devices, there is provided an oscillator 24 whose output signal f1 is divided via dividers 23 in frequencies f2 to fn. According to FIG. 6, each one of the tension-introducing devices $20_l$ to $20_n$ is fed via a power amplifier 25 with a frequency f1 to fn. These frequencies are further fed as reference frequency to the lock-in amplifiers $22_l$ to $22_n$.

The operation of the system is now such that the lock-in amplifiers $22_l$ to $22_n$ act as small-band filters so that the output signals $11ai$ to $11an$ can be directly coordinated with the forces applied by the tension-introducing devices $20_l$ to $20_n$ so that each output signal $11ai$ to $11an$ represents the course of the weft thread at the point where force has been introduced by the tension-introducing devices $20_l$ to $20_n$. Therefore, a garland distortion, for instance, can be detected with this system.

Figure 17:
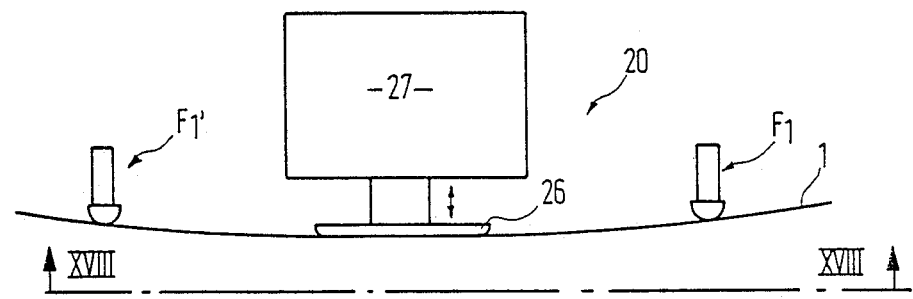
FIG. 17 is another preferred embodiment of the invention in side view along line XVII—XVII of FIG. 18.
Figure 18:
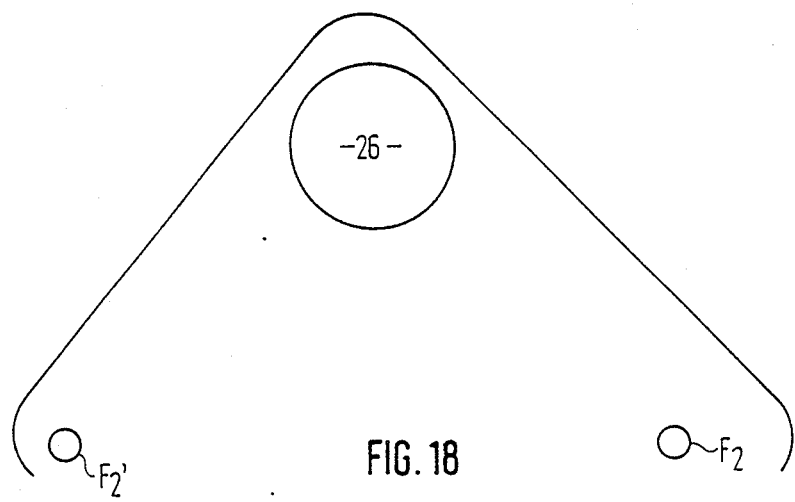
FIG. 18 is a view along line XVIII—XVIII of FIG. 17.

Another preferred embodiment of the invention based on the same principal as the above described arrangements is diagrammatically shown in FIGS. 17 and 18. In this arrangement, there is provided a tension-introducing device 20, which (the same as the tension-introducing device of FIG. 15 and 16) likewise applies tension to a textile sheet 1 in the form of vibrations. There is provided for this purpose an electrodynamic vibrator 27 whose piston 26 rests upon the textile sheet 1. In a symmetric arrangement all around the piston 26, there are situated detectors F1 to F2' (FIG. 18) coupled via a full bridge circuit (see FIG. 16) with a monitoring amplifier whose output signal thus represents the course of the weft thread on the touch-down point of the piston 26 relative to the arrangement of the detectors F1 to F2'. The monitoring amplifier can likewise be a lock-in amplifier whose reference frequency corresponds to the feed frequency of the electrodynamic vibrator 27. Instead of a lock-in amplifier, thre can be provided also a conventional band-pass filter whose transmission frequency is adjusted to the feed frequency of the electrodynamic vibrator 27.

This arrangement can thus be constructed as a "compact instrument" where a guided textile sheet 1 can be arranged in any desired place. The introduction of the tension in the form of vibration has here the advantage that a high precision can be attained as result of a high signal-to-noise ratio via the selective signal recognition.

Figure 19:
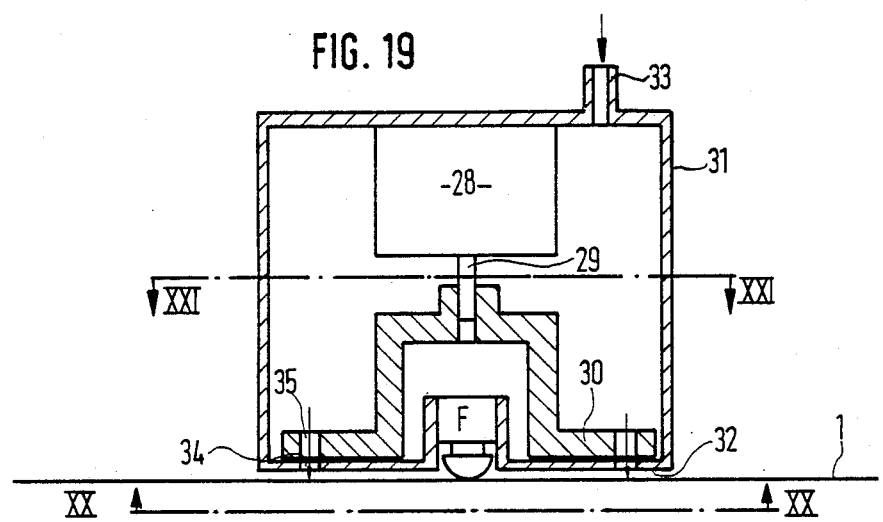
FIG. 19 is a longitudinal section through another preferred embodiment of the invention along line XIX—XIX of FIG. 20.
Figure 20:
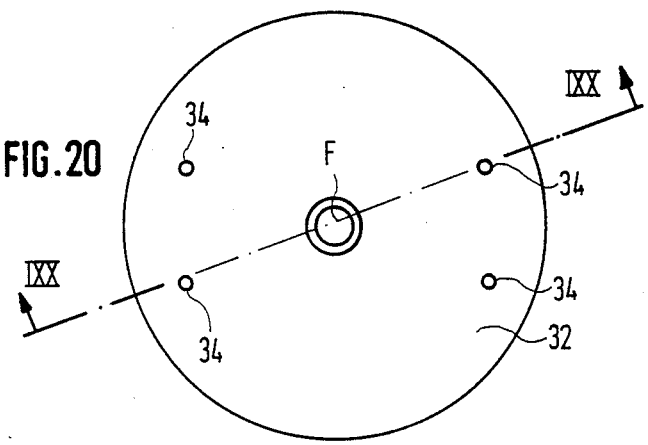
FIG. 20 is a view along line XX—XX of FIG. 19.
Figure 21:
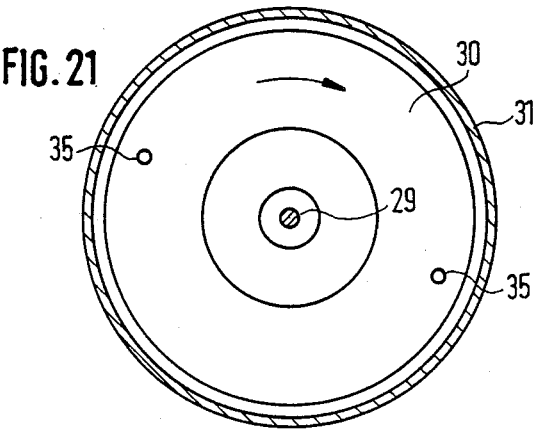
FIG. 21 is a section along line XXI—XXI of FIG. 19.

In FIGS. 19 to 21 is shown another preferred embodiment of the invention, the principle of which is similar to the embodiment of FIG. 17/18.

In this embodiment of the invention, there is provided a housing 31 which can be supplied with compressed air via a compressed-air connection 33. The housing 31 has a substantially cylindrical configuration.

At the bottom 32 of the housing 31, bores 34 are made symmetrically with the center. In the center of the bottom 32, there is positioned a detector F which projects above the level of the bottom 32 and can be suspended over a textile sheet 1.

An electromotor 28 on whose shaft 29 rests a perforated disk 30 is concentrically provided in the housing 31. The perforated disk 30 is provided with bores 35 whose distance from the axis of rotation defined by the shaft 29 is equal to the distance of the housing bores 34 from the center of the housing 31. The disk 30 is here situated closely over the inner surface of the housing bottom 32 so that compressed air, which is introduced in the housing 31 through the compressed-air connection 33, can only escape from the housing bores 34 when the bores 35 in the perforated disk 30 are aligned with the bores 34 in the housing bottom 32.

Two diammetrically disposed bores 35 are provided in the perforated disk 30 while a total of four bores in symmetrical arrangement is provided in the housing bottom 32 (see FIG. 20/21). By virtue of this arrangement, when the perforated disk 30 rotates (see arrow in FIG. 21) by action of the motor 28, there results a pulse-like blasting of the textile sheet 1 (see arrows in FIG. 29) which takes place periodically between the diammetrically opposite pairs of bores 34 in the housing bottom 32.

Accordingly, in this apparatus, the fabric is alternatively stretched in two directions each time with equal power amplitudes whereby it is possible to measure the transmission of the stretching introduced via the detector F. In suitable synchronization of the output signals of the detector F with the rotating position of the electromotor 28, which can be ensured via a transmitter of the angle of rotation or the like, it is thus possible to determine the course of a weft thread at the touch-down point of the detector F. This arrangement, the same as that of FIGS. 17 and 18, can also be suspended in any place desired over a spread out textile sheet 1.

As it results from the above specification, these separate features and variants can substantially be combined and modified as desired. These combinations and modifications that the expert can conceive are likewise essential in the invention.

What is claimed is:

1. An apparatus for measuring the position of weft threads and for aligning the weft threads in continuously traveling textile sheets comprising first and second chain guides being arranged in parallel to a travelling direction for moving the textile sheets in said travelling direction, said first chain guide having a projection perpendicular to said travelling direction for introducing a tension force at a point of the textile sheet, said second chain guide having force detector means being arranged, in said travelling direction, symmetrically with respect to said projection for detecting forces applied to said weft threads by said projection and for generating an output signal in accordance to said detected forces;

aligning elements; and means for adjusting said aligning elements in response to the output of said force detector means.

2. The apparatus of claim 1, wherein the second chain guide has a protection in the same direction as the projection of the first chain guide and at least two force detector devices are provided.

* * * * *